UNITED STATES PATENT OFFICE 2,412,303

FIRE RETARDANT LINOLEUM TYPE COVERINGS

Donald H. Spitzli, Summit, and Ralph W. Charlton, Montclair, N. J., assignors to Congoleum-Nairn Inc., a corporation of New York No Drawing. Application January 8, 1945, Serial No. 571,967

7 Claims. (Cl. 106—18)

This invention relates to smooth surface coverings suitable for covering floors, walls, furniture or the like, and relates particularly to smooth surface coverings of the linoleum type.

It is a purpose of this invention to provide a smooth surface covering of the linoleum type which is fire-retardant. It is a purpose according to certain embodiments of this invention to provide a smooth surface covering of the linoleum type which is scorch resistant in that it is highly resistant to disfigurement or other permanent injury due to such causes as lighted cigarettes or cigars coming in direct contact therewith. It is a purpose according to preferred embodiments of this invention to provide a smooth surface covering of the linoleum type not only which is scorch resistant but also which is fire retardant to the degree that it can be exposed to very high combustion inducing temperatures with substantially no propagation of flame.

Conventional linoleum coverings of the type which have been on the market for many years comprise a suitable strain resisting backing such as burlap or a bituminized felt and a decorative and wear-resistant surface layer of linoleum composition. The linoleum composition generally comprises about 30% to 45% by weight of linoleum cement in the form of an oxidized drying or semi-drying oil, generally linseed oil, which has been fluxed with a resinous material such as rosin constituting about 15% to 35% by weight of such linoleum cement. The filler used with the linoleum cement comprises a mixture of an organic filler such as wood flour, ground cork or the like together with mineral fillers, and pigment which imparts desired color.

In the preparation of linoleum cement, there are different procedures which can be used, the most desirable being enumerated below.

*Method 1.*—The raw or untreated drying or semi-drying oil is subjected to mechanical agitation and controlled oxidation and polymerization at a temperature of the order of 160° F. to 220° F. in the presence of the entire resin content of the cement and in the presence of conventional metallic driers until a mass of light gel-like consistency is obtained. This process is generally referred to as the Wood-Bedford process (British Patent No. 7742 of 1893).

*Method 2.*—The raw or untreated drying or semi-drying oil alone is subjected to controlled vigorous mechanical agitation in the presence of an excess of air at temperatures of the order of 160° F. to 220° F. to provide a partially oxidized liquid oil of dielectric constant at 75° F. between 4.85 and 5.05. The oil is then mixed with the resin component of the cement and a conventional metallic drier, and the reaction is completed as in method 1.

*Method 3.*—The raw or untreated drying or semi-drying oil is oxidized and polymerized to a soft light colored mass of gel-like consistency known in the art as "blown oil" at temperatures of the order of 160° F. to 220° F. by mechanical agitation in the presence of excess air and conventional metallic driers. This gel-like product is subsequently fluxed and agitated with the resin constituents of the linoleum cement at temperatures in the neighborhood of 300° F. to promote further polymerization and until the desired gel-like consistency is established. A portion of the blown oil may be replaced by more completely oxidized oil such as that produced by the scrim process wherein the oil is oxidized in the presence of air in the form of a film applied to a fabric according to the Walton process (British Patent No. 209 of 1860).

After the linoleum cement has been prepared, it is mixed with the filler material, the mixing ordinarily being accomplished by a series of kneading and mixing operations until the desired thorough incorporation of the filler material is accomplished. The resulting linoleum composition in the desired color or colors is then molded into sheet-like form and is applied to the strain resisting foundation or backing as by calendering or pressing so as to become integrally united therewith. At the time of application to the backing, the linoleum composition has not attained the hardness and toughness desired in the finished product and for this reason the linoleum is subjected to a seasoning or "stoving" at elevated temperatures until the linoleum composition attains the desired properties as a result of further oxidation and polymerization of the drying oil component of the linoleum cement.

The linoleum product that is produced according to the conventional process above mentioned is notable for the fact that it is highly resistant to abrasion and has satisfactory resistance to indentation under load and at the same time is resilient and flexible. It is also attractive in appearance. The fact that linoleum possesses this desirable combination of properties accounts for its successful adaptation and widespread use as floor coverings or other coverings which are required to be tough and highly resistant to wear while at the same time of attractive appearance.

While proposals have been made from time to time for modifying the manufacture of linoleum coverings, the commercial practice has remained very much the same for many years. This has been due to the requirements for successfully fabricating the product and to the properties which are essential in the finished product. In order to be successfully manufactured, the linoleum composition must be "workable," that is, the linoleum cement must be capable of being worked up with the filler to form a plastic mass having good body which is not crumbly or "cheesy," and which, on the other hand, is not excessively thermoplastic so as to become unduly softened in producing the linoleum composition by means of the conventional mixing equipment. Moreover, this plastic mass must be capable of being sheeted out as by calendering to provide a smooth layer free of surface irregularities and must retain its form during the subsequent seasoning or "stoving." The finished product must be resistant to wear and to indentation under load and at the same time should be resilient and flexible for if it is excessively hard and brittle or "short," the covering will crack and disintegrate in use.

While conventional linoleum composition has many desirable features and advantages, it has the disadvantage of having very little resistance to scorching upon casual contacts with burning material as by accidental contact with lighted cigarettes, cigars, matches or the like. It is not of uncommon occurrence for a lighted cigarette to fall on a linoleum which is used as a floor covering or as a covering for a table or desk, the cigarette continuing to burn where it has fallen. In such case ordinary linoleum becomes badly scorched and an unsightly burn or scar is left which cannot be removed.

Conventional linoleum is likewise unsuitable when high resistance to fire upon exposure to very high temperatures is desired, as, for example, in the construction of ships as a covering for a metal flooring or a metal partition. In the event of fire on one side of such metal flooring or partition, the flame will not pass through the metal barrier, but the metal barrier may become so highly heated that the covering material on the opposite side will give off inflammable gases which ignite and thus cause propagation of flame on the deck above or in an adjoining compartment or room. Conventional linoleum falls far short of meeting the fire retardant requirements for installations of this character.

An extremely severe test for determining the fire retardance of a covering of the linoleum type consists in subjecting the covering to direct contact with a metal surface heated to approximately 2000° F. The linoleum type covering is cut into two samples 1⅛" x 8" which are secured by suitable tie wires to the opposite sides (with the back of each sample in direct contact) of an electrical heating element having an effective heating area of 1" x 6". The heating element consists of .017" thick mild annealed steel supported horizontally flat in any suitable way and connected to an electric generator which is adapted to provide an open circuit voltage of approximately 80 volts and to develop a current of approximately 180 amperes when short circuited through the heating element. A suction blower is placed two feet above the sample to remove smoke. An open gas flame is positioned 1 inch above the test specimen and extends about 5 inches parallel to the test specimen. After the sample has been placed in position for testing, the gas flame is turned on and the circuit is closed. The time elapsed between the closing of the circuit and the first appearance of flame is considered the measure of the fire retardance of the material undergoing test. The first appearance of flame refers to flame occurring at the surface of the linoleum. However, any flashes or flames which appear in the smoke and travel to the linoleum are to be considered as a first appearance of flame. The foregoing test is extremely severe, since the open gas flame tends to ignite any inflammable material in the smoke or fumes evolved from the sample even if the temperature which the sample has attained is well below the ignition temperature of the evolved gases. The temperature of the sample rises during the course of the test to well above such ignition temperature. A conventional linoleum floor covering of ⅛" gauge commonly referred to as "battleship" linoleum will begin to flame in about 130 seconds, and thereafter burns freely and will continue to burn after the electric heating current is discontinued until the sample is consumed except for any non-combustible ash residue.

When the time in seconds to first appearance of flame is of the order of 230 seconds, the resistance to ignition and burning is high and the product affords a high degree of protection against propagation of flame. Such products can readily be produced in the practice of this invention. When the time in seconds to first appearance of flame is of the order of 270 seconds, the protection against propagation of flame is virtually complete and products of such extremely high fire retardance and of even higher fire retardance can readily be manufactured in the practice of this invention.

It is a further advantage of this invention that fire retardant coverings of the linoleum type having very high scorch resistance and very high resistance to ignition and burning can readily be manufactured by the usual technique and equipment used in the manufacture of ordinary linoleum. The fire-retardant composition of this invention has good workability and can readily be formed into products of the linoleum type. The finished product is especially notable for its resilience and high abrasion resistance, being comparable in these properties with ordinary linoleum. It also affords satisfactory flexibility and high resistance to indentation under load.

The new product of this invention can be illustrated in connection with the following description of a typical embodiment thereof:

| Ingredients | Per cent by weight |
|---|---|
| Binder (equal proportions by weight of oxidized linseed oil and chlorinated paraffin of about 60% chlorine content) | 22.5 |
| Asbestos fiber | 23.2 |
| Antimony trioxide | 27.6 |
| Ground limestone | 13.9 |
| Iron oxide red | 12.8 |

In the manufacture of the new product the binder is preferably prepared according to either method 1 or 2 above described, although method 3 may be employed, if desired. In the adaptation of these methods using chlorinated paraffin, the chlorinated paraffin is introduced at that stage of the process where resinous material is added to the oil in the above described methods. In any such case, the oxidized oil and chlorinated paraffin are mechanically worked together at elevated temperature (above about 160° F.) to produce a homogeneous, plastic, tough cementitious material, although any means for accomplishing a thorough commingling of the oxidized oil and chlorinated paraffin will afford some of the advantages of this invention. After the binder has been produced in a plastic gel-like condition the filler materials are then incorporated by means of suitable conventional mixing machinery and the resulting composition is formed into a sheet or layer, which ordinarily is from about 1/40 to 1/4 inch in thickness, the sheet or layer being made integral with a suitable backing such as burlap by being pressed thereagainst while in a plastic and workable condition. Thereafter, the product is seasoned in the same way that ordinary linoleum is seasoned, and, after seasoning, the product is ready for use.

The properties of the product produced as above described, the layer of fire retardant composition being 1/8 inch in thickness, are set forth below in comparison with conventional battleship linoleum (of terra cotta color produced by iron oxide red pigment) wherein the linoleum composition is 1/8 inch in thickness, the base in each case being burlap deeply embedded in said composition.

| Properties | Our new fire retardant linoleum covering | Conventional battleship linoleum |
| --- | --- | --- |
| Fire retardance | 310 seconds | 126 seconds. |
| Scorch resistance | Excellent | Poor. |
| Abrasion resistance | 1.2% | 1.5%. |
| Indentation under load | 20.5% | 24.8%. |
| Resiliency | 54.1% | 63.6%. |
| Flexibility | 3½" | 1¼". |

The fire retardance is the time in seconds to first appearance of flame under the test procedure described hereinabove. In connection with this test it may be mentioned that in the case of our new fire retardant linoleum type covering, the flaming discontinued immediately upon shutting off the current, instead of continuing until the sample is consumed as is the case with ordinary linoleum. Moreover, such flame as did occur in the case of our new product was an inch or less in height and only a few pin-point flames occurred while in the case of conventional linoleum a 7 inch flame was produced and the flame extended throughout the extent of the sample. It is apparent that the new product of this invention affords extremely high resistance to propagation of flame even when subjected to temperatures approaching 2000° F.

The scorch test consists in placing an actively burning cigarette on its side on the upper surface of a horizontally disposed sample of the material to be tested, and permitting the cigarette to burn out. Excellent performance is indicated when, upon removing the cigarette residue and rubbing the sample lightly, the effect of the lighted cigarette is virtually non-discernable and the surface is essentially unblemished. Poor performance is indicated by a permanent darkening or blackening of the surface of the sample, and possibly some surface consumption of the material, so that an unsightly area is produced which cannot effectively be diminished or rendered less objectionable by rubbing, washing or polishing. Performances which may be termed "good" or "fair" lie between "excellent" and "poor." The scorch test wherein a lighted cigarette is used, is a useful test since the temperature at which any cigarette will burn is very nearly the same and is typical of the temperature of burning paper scraps, lighted matches, glowing embers from a fire place, lighted cigars, etc., which are the most common causes of scorching linoleum installations.

The abrasion resistance property is measured as the percentage weight loss which occurs when a disc of the covering material 4 inches in diameter is subjected to 5000 revolutions under the action of two weighted self-clearing rotating abrading surfaces ½ inch in width which operate at a fixed distance from the circumference of the sample. A standard Taber Abraser is used.

Indentation under load is determined by measuring the penetration resulting when a 200 lb. load is applied on a 0.282 inch diameter pin resting on the surface of the sample for one minute, and is expressed in percent of original thickness of sample. Such a load is equivalent to 3200 pounds per square inch.

Resiliency is the elastic recovery which occurs within the period of one minute after removal of the 200 lb. load used in making the indentation test and is expressed as a percentage of the original indentation.

Flexibility is expressed as the diameter in inches of the smallest mandrel over which a 2 inch wide sample can be flexed 180° in about 5 seconds without cracking or breaking.

The abrasion, indentation, resiliency, and flexibility tests are carried out at approximately 77° F. and 60% relative humidity.

It is seen from the foregoing that the new fire retardant covering of this invention has properties of abrasion, indentation, resiliency and flexibility comparable to high grade linoleum, but unlike ordinary linoleum, has excellent scorch resistance and very high fire retardant properties. It may also be mentioned that the new product of the invention as manufactured has a lustrous, smooth and easily cleansed surface and is superior to conventional linoleum in these respects.

It is one of the features of the new covering of this invention that the binder component of the fire-retardant composition comprises a mixture of an oxidized drying or semi-drying oil such as linseed oil and chlorinated paraffin in certain critical proportions. The binder component of the fire retardant composition should contain from 40% to 60% by weight of the oxidized drying or semi-drying oil and from 40% to 60% by weight of the chlorinated paraffin. Preferably the binder component consists entirely of the oxidized oil and chlorinated paraffin although it is not without the scope of this invention to employ minor amounts of resins, such as oil soluble phenolic, or film-forming materials, such as ethyl cellulose, or plasticizers, such as methyl ester of rosin, or mixtures thereof, useful in modifying the workability of the binder, so long as the oxidized oil constitutes at least 40% by weight of the total binder and the chlorinated paraffin constitutes at least 40% by weight of the total binder. It is better practice however, when at least 90% by weight of the binder component of the fire-retardant composition consists essentially of the oxidized oil and the chlorinated paraffin.

The oxidized oil may be any drying oil such as linseed oil, perilla oil, dehydrated castor oil or the like, or a semi-drying oil such as soya bean oil, or mixtures thereof although, linseed oil or other oil of the linseed oil type is normally to be preferred. The oil may be whole oil or may be an oil from which certain non-hardening or unoxidizable constituents have been removed or may comprise reaction products with polybasic acids or anhydrides such as maleic acid or phthalic anhydride. Any such whole or modified drying or semi-drying oil is referred to herein and in the claims as a "siccative" oil. When it is stated that the oil is "oxidized" it is intended that the oil has been brought to the gel-like stage as a result of oxidation which is normally accompanied by more or less polymerization.

The selected chlorinated paraffin or chlorinated paraffins should have chlorine content of from about 40% to about 80%. The chlorinated paraffin may vary somewhat depending upon the condition of the paraffinaceous material prior to the chlorination treatment. Those chlorinated paraffins which are normally hard at atmospheric temperature are preferably employed although softer types of chlorinated paraffin may be employed. The selection of chlorinated paraffin or a mixture thereof will preferably be made so as to provide a binder having a chlorine content of about 25% to about 40%. In this connection, the term chlorinated paraffin is to be regarded as covering chlorinated paraffin oil.

The chlorinated paraffin and the oxidized oil are compatible and form a homogeneous gel-like cementitious material. The blended mixture has good working properties which accounts for the fact that very desirable coverings of the linoleum type can readily be produced therefrom. During the blending of the oxidized oil and the chlorinated paraffin there is probably some interaction of a chemical or quasi-chemical nature induced under the conditions of elevated temperature and mechanical working although the precise nature of the action is not completely understood. In any event the mixture of these materials is extraordinary in that the mixture possesses the workability, toughness, resiliency, etc., which are characteristic of the oxidized oil component and at the same time imparts to linoleum composition fire retardant properties approaching the fire-retardant properties imparted by chlorinated paraffin which has not been commingled with inflammable material such as an oxidized drying or semi-drying oil. In order to obtain this special combination of properties it is essential, however, to employ the oxidized oil and the chlorinated paraffin within the proportional limits stated hereinabove. In such case one obtains the special advantages that are afforded by the combination of the chlorinated paraffin with the drying or semi-drying oil which has been converted by oxidation and polymerization to the gel-like stage to afford a plastic, tough binder which imparts fire retardance in very high degree in spite of the large proportion of the combustible oxidized oil component.

The chlorinated paraffin which is employed in the practice of this invention is to be distinguished from a substance such as chlorinated rubber. Chlorinated paraffin has a reasonably sharp melting point, and, if disposed in a film, the film tends to be brittle unless mixed with a plasticizer whereupon the film becomes sticky, soft and lacking in toughness. Chlorinated rubber, on the other hand, has no sharp melting point and decomposes long before it can be heated to a freely flowing liquid and forms hard, tough films. Chlorinated rubber will dissolve in oxidized oil only to a limited extent while chlorinated paraffin will readily do so. If chlorinated rubber is mixed with the raw or untreated oil and the two materials are subjected to oxidation together, the viscosity increases so rapidly that the oil cannot be agitated adequately with the chlorinated material or be adequately oxidized before the oxidation operation has to be discontinued. The result is a soft highly thermoplastic mixture. Chlorinated paraffin acts differently from chlorinated rubber, in that it does not interfere with the oxidation of the oil and permits the oil to be oxidized highly and be adequately agitated with the chlorinated paraffin without excessive stiffening of the mass, thereby providing a readily workable composition which is not unduly susceptible to changes in plasticity due to temperature changes. It is thus seen that chlorinated rubber can be combined only to a very limited extent with oxidized oil due to non-compatibility, while, if chlorinated rubber is mixed with an unoxidized oil, the oil thereafter cannot be oxidized properly for the production of a linoleum composition which has satisfactory physical properties and which has the high fire retardant properties that are attained according to the practice of this invention.

The amount of the binder component of the fire retardant composition is likewise critical and should be of the order of 20% to 35% by weight of the fire retardant composition and preferably is about 20% to 25% by weight of the fire retardant composition.

The balance of the fire retardant composition in addition to the binder component should consist of finely-divided solid substantially non-inflammable filler material. Preferably mineral filler material is employed although organic material, such as organic fiber or non-fibrous organic material which has been thoroughly treated with combustion depressant substances such as ammonium sulfamate, ammonium phosphate, or ammonium sulphate, to render it substantially non-inflammable may be employed. A filler material is regarded as non-inflammable if it does not give off gases or vapors which are ignitable so as to burn with a free flame when the filler is subjected in the form of a layer about ⅛ inch in thickness to the temperature of an ordinary flame, namely, a temperature of about 1000° F. However, most of the combustion depressant impregnants are somewhat water soluble, and for this reason treated organic fillers are not preferred. It is desirable that the filler consist essentially of water insoluble filler material. In order to provide good scorch resistance any organic filler material should constitute not more than 10% by weight of the fire retardant composition and it is preferable that the fire retardant composition be essentially free of organic filler material.

It is essential that the fire retardant composition contain at least 10% of fiber. The fiber ordinarily constitutes from about 10% to about 30% by weight of the composition. The preferred fibrous filler is asbestos, by which is intended any asbestiform mineral fiber such as chrysotile, anthophylite, various amphiboles and the like. The fiber may be of any length that lends itself to uniform incorporation in the composition. Those fibers falling within the groups designated No. 6 and No. 7 according to the classification of the Quebec Asbestos Producers Association that is promulgated by the Canadian Government and is widely recognized in the United States and many other countries, have been found to be suitable. The fiber should not be reduced in size to such an extreme degree as to lose its fibrous characteristics. Thus asbestos of the fineness sometimes used in paints and which resembles a pigment lacks the fibrous characteristics of asbestos fibers and is not as desirable. In addition to asbestos fibers, other mineral fibers such as rock wool, slag wool, glass fibers and the like may be employed in the finely-divided condition of the character above mentioned although such fibers tend to be more frangible and brittle than asbestos fibers and are less desirable for this reason. It is also possible to employ organic fiber, which may be either animal or vegetable, such as cotton, wood fibers, wool, etc., if the fibers have been rendered substantially non-inflammable by suitable chemical treatment. It is preferable, however, to eliminate any organic material, as has been mentioned hereinabove, both because such material is less resistant to burning and scorching, and because such material tends to be absorptive of moisture and to swell when moistened, which properties are undesirable in a covering of the linoleum type under conditions of moisture exposure.

The filler component likewise should contain a substance such as ground limestone which acts as a stabilizer inhibiting decomposition of the binder and neutralizing any liberated hydrochloric acid which would have a corrosive effect on certain types of installation. The amount of such material should be at least about 50% by weight of the weight of the chlorinated paraffin in the composition, and preferably is used in an amount by weight that is approximately equal to the weight of the chlorinated paraffin in the composition. Ordinarily the amount of ground limestone will be of the order of 5% to 20% of the fire retardant composition. Other alkaline earth metal carbonates may be employed and, in this connection, the term alkaline earth metal is used broadly as including magnesium. Thus instead of ground limestone, ground dolomite, which is a naturally occurring mixture of calcium carbonate and magnesium carbonate may be employed.

The filler component of the composition may, of course, include suitable pigments for imparting desired color to the fire retardant composition. Any suitable pigment material may be employed, although mineral pigments such as iron oxide pigments, ochre pigments, and the like are preferred. Other filler materials, such as mica, diatomaceous earth, silica, barytes or the like can be used if desired as part of the filler component of the fire retardant composition.

In the typical example of fire retardant composition hereinabove described the filler component of the fire retardant composition includes antimony trioxide. The employment of antimony trioxide is essential when very high fire retardance is desired, namely fire retardance such that, under the fire retardance test above described, the time interval to first appearance of flame will be 270 seconds or greater. For this reason the employment of antimony trioxide so as to constitute at least 20% by weight of the fire retardant composition constitutes preferred practice. The amount of antimony trioxide ordinarily will be between 20% and 40% by weight of the fire retardant composition. However, when a lesser degree of fire retardance is permissible, while still retaining good scorch resistance, the amount of antimony trioxide may constitute less than 20% by weight of the fire retardant composition or may even be omitted altogether. Thus, for example, a fire retardant composition wherein the binder consisted of equal proportions of chlorinated paraffin and oxidized linseed oil and constituted 22.5% by weight of the fire retardant composition, and the balance of the composition consisted of 23.2% of asbestos, 41.5% of ground limestone and 12.8% of pigment, had good scorch resistance and exhibited fire retardance as evidenced by 235 seconds to first appearance of flame, which is a very great increase in fire retardance as compared with conventional linoleum composition. While the presence of antimony trioxide has the effect of promoting the more rapid production of fire retarding gases, the fact that antimony trioxide can be omitted while still retaining a high degree of fire retardance is indicative of the surprisingly high fire retardance and combustion resistance that are afforded by the combination of chlorinated paraffin and oxidized oil in the critical proportions mentioned, notwithstanding that the oxidized oil occurs in relatively large proportion.

In the manufacture of smooth surface coverings, the fire retardant composition is molded to a layer of desired thickness and should be at least one fortieth of an inch in thickness. Usually for floor covering purposes the fire retardant composition is about 1/20 to about 1/4 inch in thickness. For covering walls, furniture and the like, the layer of fire retardant composition ordinarily is somewhat less in thickness usually 1/40 to 1/16 inch. The fire retardant composition is ordinarily made integral with a strain resistant backing, but this is not essential and the composition can, if desired, be employed per se and without a backing, particularly when formed into tile-like bodies. When the fire retardant composition is made integral with a backing or foundation sheet, the covering can be made up into continuous sheets, similarly to ordinary linoleum, or in the form of slabs or tiles of any desired size. If desired, the backing material to be used can be rendered fire resistant by treating the combustible fibrous material with a suitable flame proofing or combustion retarding chemical or by employment of mineral fibers in whole or in part. However, particularly in the thicker coverings suitable for floors and the like, the product will have adequate fire retardance even though an ordinary backing such as burlap or similar material is used. If desired canvas may be employed, and for lighter weight products, cotton sheeting can be used as the backing.

It is desirable in the manufacture of fire retardant smooth surface coverings according to this invention, and it is an advantage of the practice thereof, to afford a covering comprising a decorative and wear resistant surface layer which is comparable to ordinary linoleum in its physical properties. Thus it is desirable that the product at 77° F. be capable of being flexed 180° about a 4 inch diameter mandrel in a period of about 5 seconds without cracking the layer of fire retardant composition and such a product is to be regarded as "flexible." Likewise the resiliency and resistance to indentation and abrasion are preferably comparable to ordinary linoleum of a quality meeting standard Federal specification. More generally, covering structures embodying this invention have the advantage of being tough and wear-resistant and are capable of withstanding heavy traffic without undue wear or rupturing or other premature failure.

While this invention has been described in connection with certain specific embodiments of the invention, it is to be understood that this has been done for illustrative purposes only and that the practice of this invention is subject to variation within the scope thereof as defined by the language of the following claims.

We claim:

1. A smooth surface covering of the linoleum type comprising a decorative and wear-resistant surface layer of fire-retardant composition which is molded to a thickness of at least about one-fortieth inch and which consists essentially of a binder constituting from about 20% to about 35% by weight of said fire-retardant composition and uniformly commingled with said binder finely-divided solid water-insoluble substantially non-inflammable filler material constituting from about 65% to about 80% by weight of said fire-retardant composition, the binder component of said fire-retardant composition comprising from about 40% to about 60% by weight of oxidized and gelled siccative oil mechanically worked at elevated temperature with from about 40% to about 60% by weight of chlorinated paraffin having a chlorine content from about 40% to about 80% to form a tough plastic cementitious material, and said filler component comprising alkaline earth metal carbonate constituting at least about 50% by weight of the weight of chlorinated paraffin in said composition, asbestiform mineral fiber constituting at least 10% by weight of said composition, and antimony trioxide constituting at least 20% by weight of said composition.

2. A smooth surface covering according to claim 1 wherein the filler component of said fire-retardant composition contains less than 10% by weight of said composition of organic material.

3. A smooth surface covering of the linoleum type comprising a decorative and wear-resistant surface layer of fire-retardant composition which is molded to a thickness of at least one-fortieth inch and which consists essentially of a binder constituting from about 20% to about 35% by weight of said fire-retardant composition and uniformly commingled with said binder finely-divided solid substantially non-inflammable filler material constituting from about 65% to about 80% by weight of said fire-retardant composition, the binder component of said fire-retardant composition containing from about 40% to about 60% by weight of an oxidized and gelled siccative oil and from about 40% to about 60% by weight of chlorinated paraffin of about 40% to about 80% chlorine content, and the filler component of said fire-retardant composition comprising an alkaline earth metal carbonate which constitutes in said composition at least about 50% by weight of the weight of the chlorinated paraffin in said composition and substantially non-inflammable fiber which constitutes at least about 10% by weight of said fire-retardant composition.

4. A smooth surface covering of the linoleum type comprising a decorative and wear-resistant surface layer of fire-retardant composition which is molded to a thickness of at least one-fortieth inch and which consists essentially of a binder constituting from about 20% to about 35% by weight of said fire-retardant composition and uniformly commingled with said binder finely-divided solid substantially non-inflammable filler material constituting from about 65% to about 80% by weight of said fire-retardant composition, said binder component of said fire-retardant composition containing from about 40% to about 60% by weight of oxidized and gelled siccative oil mechanically worked at elevated temperature with about 40% to about 60% by weight of chlorinated paraffin having a chlorine content of about 40% to about 80% to form a tough, plastic cementitious material, and said filler component of said fire-retardant composition containing alkaline earth metal carbonate constituting from about 5% to about 20% by weight of said composition and at least about 50% by weight of the weight of the chlorinated paraffin in said composition, and containing substantially non-inflammable fiber constituting about 10% to about 30% by weight of said composition.

5. A smooth surface covering according to claim 4 wherein said fiber consists essentially of mineral fiber.

6. A smooth surface covering of the linoleum type comprising a decorative and wear-resistant surface layer of fire-retardant composition which is molded to a thickness of at least one-fortieth inch and which consists essentially of a binder constituting from about 20% to about 35% by weight of said fire-retardant composition and uniformly commingled with said binder finely-divided solid water-insoluble substantially non-inflammable filler material constituting from about 65% to about 80% by weight of said fire-retardant composition, said binder component of said fire-retardant composition containing from about 40% to about 60% by weight of oxidized and gelled siccative oil mechanically worked at elevated temperatures with about 40% to about 60% by weight of chlorinated paraffin having a chlorine content of from about 40% to about 80% to form a tough plastic cementitious material, the chlorine content of said binder being not less than about 25% by weight of said binder, and said filler component of said fire-retardant composition comprising alkaline earth metal carbonate constituting from about 5% to about 20% by weight of said composition and at least about 50% by weight of the weight of the chlorinated paraffin in said composition, asbestos fiber constituting from about 10% to about 30% by weight of said composition, and antimony trioxide constituting from about 20% to about 40% by weight of said composition.

7. A smooth surface covering of the linoleum type comprising a decorative and wear-resistant surface layer of fire-retardant composition molded to a thickness of at least one-fortieth inch, said fire-retardant composition consisting essentially of

| | Per cent by weight |
|---|---|
| Binder | 20–25 |
| Asbestos fiber | 10–30 |
| Antimony trioxide | 20–40 |
| Alkaline earth metal carbonate | 5–20 |
| Pigment | 5–20 | said binder consisting essentially of 40–60% by weight of oxidized siccative oil and 40–60% of chlorinated paraffin of 40–80% chlorine content, and the chlorine content of said binder being not less than about 25% by weight of said binder, and said alkaline earth metal carbonate constituting in said fire-resistant composition at least about 50% by weight of the weight of the chlorinated paraffin in said composition.

DONALD H. SPITZLI.
RALPH W. CHARLTON.